United States Patent
Alpert

[15] 3,670,916
[45] June 20, 1972

[54] FOOD CONTAINERIZATION

[72] Inventor: Arnold L. Alpert, 633 Olmstead Avenue, Bronx County, N.Y. 10472

[22] Filed: Feb. 19, 1970

[21] Appl. No.: 12,686

[52] U.S. Cl. ..........................220/9 F, 99/171 R, 206/4, 220/44 R, 220/89 A
[51] Int. Cl. .......................................................B65d 25/18
[58] Field of Search .................220/9 R, 9 F, 9 D, 17, 89 A, 220/44 R, 44 C; 99/171 R; 206/4, 46 F

[56] References Cited

UNITED STATES PATENTS

| | | | |
|---|---|---|---|
| 2,369,765 | 2/1945 | Waters | 99/171 R |
| 2,436,097 | 2/1948 | Clarke | 206/4 |
| 2,507,425 | 5/1950 | Swartout | 220/9 R |
| 2,885,107 | 5/1959 | Bliss | 220/17 |
| 3,051,582 | 8/1962 | Muckler et al. | 99/171 R |
| 3,484,015 | 12/1969 | Rowan | 206/4 X |
| 1,300,712 | 4/1919 | Ferdon | 220/17 |
| 2,190,827 | 2/1940 | Deeley | 220/44 C |
| 2,726,002 | 12/1955 | Dalianis | 220/89 A X |
| 3,025,947 | 3/1962 | Hammer | 206/4 |
| 3,130,288 | 4/1964 | Monaco et al. | 206/4 X |

FOREIGN PATENTS OR APPLICATIONS

| | | | |
|---|---|---|---|
| 478,553 | 11/1969 | Switzerland | 220/9 F |
| 798,818 | 3/1936 | France | 220/17 |

Primary Examiner—Joseph R. Leclair
Assistant Examiner—James R. Garrett
Attorney—Lawrence S. Lawrence

[57] ABSTRACT

An insulated food container is provided having an outer vessel formed at least in part of heat-resistant material and having sides which terminate in a peripheral rim portion with an inwardly disposed peripheral ledge. An inner vessel adapted to hold the food has a peripheral flange which rests on the ledge of the outer vessel and positions the inner vessel inwardly with respect to the outer vessel to define an insulating air space therebetween. A protective annular ring fabricated from material of higher heat distortion resistance than the outer vessel is disposed on the peripheral ledge of the outer vessel beneath the flange of the inner vessel. The container is closed by a lid having suitable means to sealably engage the rim portion of the outer vessel and has a conically shaped portion, the vertex of which is fracturable under high internal pressure to provide relief of the vapor pressure that may accumulate within the container.

9 Claims, 4 Drawing Figures

FOOD CONTAINERIZATION

BACKGROUND

This invention relates to insulative food containers, particularly adapted for utilization by carry-out restaurants and the like to package hot food items such as pizza pie.

In the last decade, a number of foam, closed-cell synthetic materials such as polystyrene were discovered and found to be inexpensive although effective heat insulators and since have become available for fabrication as hot food containers. To date, however, little success has been achieved in the attempt to adapt materials of this type, not so much from the standpoint of the cost factor which would competitively preclude its utilization, but because of the heat distortion properties inherently characteristic of the materials. It should be noted that the heat distortion resistance ranges of most foam synthetic plastic materials such as polystyrene, polyethylene and polypropylene are from 160° to 270° F. and when used above these temperatures, a thermal and structural breakdown occurs. In particular, foam closed-cell polystyrene, when used above its heat distortion resistance range of from 160° to 200° F., limits and restricts its practical and commercial use for fabrication as insulative food containers when the temperature of the hot food article to be contained is above 200° F.

Thus, for example, the use of foam closed-cell polystyrene configured as a receptacle for packaging a pizza pie whose temperature when transferred from oven to receptacle is appreciably above 200° F., will result in a melting of the polystyrene in contact with the hot pizza, causing an adhesion between said pizza and container.

OBJECTS AND SPECIFICATIONS

It is, therefore, a primary object of this invention to provide an inexpensive food container comprising outer vessel and lid members fabricated from a specific combination of materials, each exhibiting a different heat distortion resistance range, which will keep the hot food product contained therein in a heated condition for a relatively long period of time and, concurrently, prevent any adhesion between the hot food article and container.

More particularly, it is a primary object of this invention to provide an inexpensive insulated food container in which the outer vessel is fabricated from a foam closed-cell synthetic material, preferably polystyrene, and employs an annular ring of synthetic material exhibiting an appreciably higher heat distortion resistance range than foam polystyrene, preferably foamed silicone, both in conjunction with an interior removable vessel adapted to rest upon the annular ring structured in such fashion so as to achieve a resultant insulated container whose thermal conductivity characteristic is appreciably below, and consequently, heat retentive property substantially above, that of a singular foam polystyrene container.

More particularly, it is yet a further object of the invention to provide a container of the type described having a dual-flanged lid member is fabricated preferably from moldable polystyrene foam beads with an interior lamina of aluminum, an outer vessel fabricated preferably from moldable polystyrene foam beads with an interior lamina of aluminum comprising a flat bottom and peripheral wall extending upwardly and outwardly from said flat bottom, terminating in an interior shoulder and circumferentially raised chamfered rim; a middle component fabricated preferably from foamed silicone and configured as an interior annular ring nested in the shoulder of the outer vessel; and an inner vessel is fabricated preferably from aluminum and configured as a vessel having a circumferential flange which rests upon the middle component, and which can be used either to receive the prepared food article or can be removed from the container cavity, utilized as a cooking vessel in the heat preparation of the food article, and then returned to the container cavity to be packaged. It should be noted that either polytetrafluoroethylene, commercially known as "Teflon TFE" or fluorinated ethylenepropylene, commercially known as "Teflon FEP" may also be substituted as the material for the interior annular ring and, polypropylene, or polyethylene may be substituted as the material for the outer vessel.

More particularly, it is yet an additional object of the invention to provide a container of the type described above in which the interior annular ring, shall exhibit an appreciably higher heat distortion resistance range than the outer vessel, said ring acting as a thermal insulator for the outer vessel when the heated cooking vessel is introduced into the container cavity and its circumferential flange rests upon said interior annular ring, thus preventing a structural breakdown of, and the interior vessel adhering to, the outer vessel. Furthermore, when the vessel is so positioned, a thermal insulative air gap shall be formed between said inner vessel and outer vessel.

It is yet a further object of the present invention to provide a container of the type described that is, at once, leakproof, germproof, and resistant to atmospheric elements.

One of the problems the carry-out food industry has been confronted with, particularly the typical carry-out pizza restaurant, can be best exemplified by the situation wherein a hot food item, say a pizza pie, is placed in a container usually configured from cardboard and then transported from place of preparation to place of consumption. Upon eating, it is discovered that much of the original taste-appealing qualities of the pizza have been lost, not so much as a result of the dissipation of heat during the interval of transportation, than because of an impartation of a "cardboard" taste to the pizza pie.

Thus, it is yet still a further object of the present invention to provide an insulated food container that is both tasteless and odorless, i.e., a container of the type described that will not impart a taste or odor to the food article introduced and contained therein.

For further comprehension of the objects of the present invention and of its advantages thereof, reference is made to the following specification and accompanying drawings in which the various novel features of the invention are more particularly set forth.

In the accompanying drawings forming a material part of this disclosure:

Figure 1:
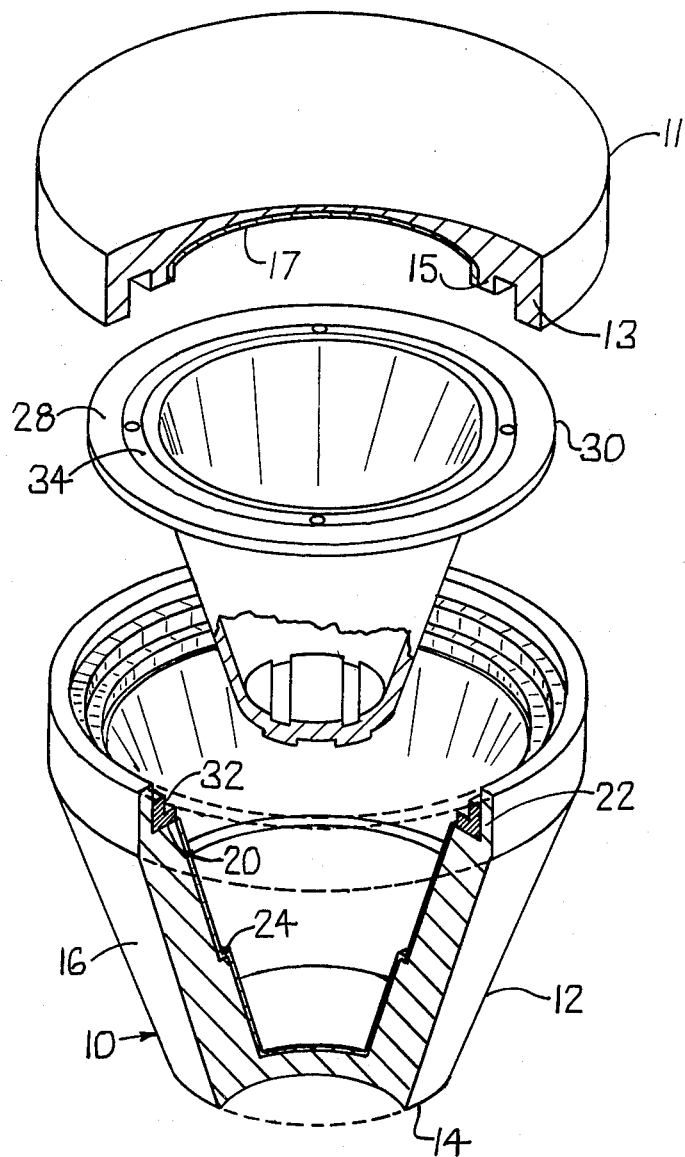
FIG. 1 is a spacial view of the container showing the lid, inner vessel and outer vessel in disengaged fashion, a section of each being broken away to illustrate the construction of the container.
Figure 2:
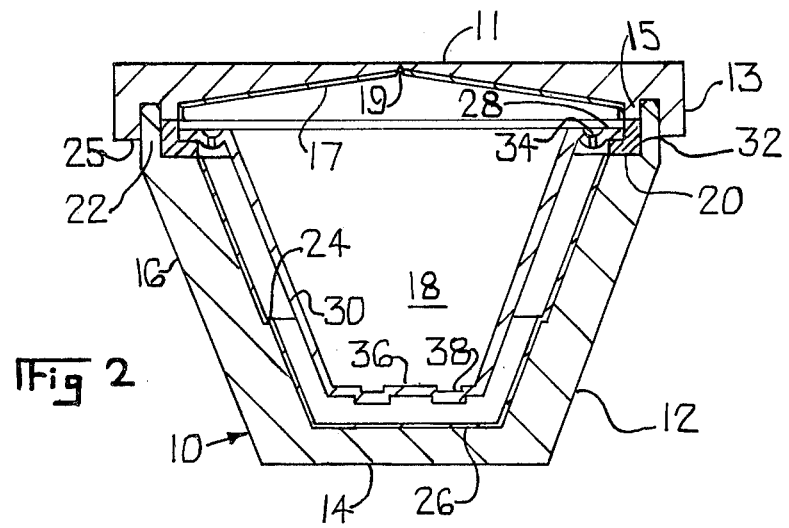
FIG. 2 is a cross-sectional view of the container illustrating the lid and outer vessel in a sealed or press fitted relationship with a positioned inner vessel.

Referring now to the drawing, the container, designated generally by reference numeral 10, includes an outer vessel 12 composed of a foam closed cell synthetic material, and having a flat bottom 14 and a frusto-shaped peripheral wall 16 extending upwardly and outwardly therefrom, forming an interior cavity 18 and terminating at an interior shoulder 20 and a circumferentially raised, annular, chamfered rim 22. An integral part of said frusto-shaped peripheral wall is an interior ridge 24 which serves to prevent a tight wedge fit if outer vessels, with the inner vessels removed, are vertically stacked in like fashion, thus facilitating easy removal of one inner vessel from another. The total interior surface area of the base cavity 18 has an aluminum lamina coating 26. A circumferential flange 28 of the inner vessel 30 rests upon an interior annular ring 32 having an L-shaped cross section which is nested in shoulder 20 (FIG. 3) and has a higher heat distortion resistance than the outer container, thus affording uniform support for said vessel within the container cavity, protective insulation between the inner vessel and the outer vessel.

The outer periphery of lid member 11 consists of two flanges 13 and 15. The interior surface of said lid member has a lamina coating 17. Said interior surface is configured in an aluminum conical shape of slight grade. The conic vertex 19 is recessed into the lid member and is caused to form a central aperture by the flexing, bowing and fracturing of the lid member at the conic vertex 19. This flexing, bowing and fracturing of the lid member results from the thermal expansion and consequent build up of air pressure within the sealed container caused by the heat emanating from the enclosed hot food article. The fracture, so formed, functions somewhat like a "diaphragmic" aperture in that it at once permits the steam vapors to escape, thereby reducing the increased air pressure within the interior cavity and then, upon the container reaching a state of internal-external pressure equilibrium and the lid member assuming its undeflected original state, it closes, resulting in a relatively hermetic seal of the container. When the container is so sealed, any recondensation of moisture edges down along the lid's conical interior surface, passes through the perforated circumferential gutter 34 of the positioned vessel 30, continues down the peripheral wall of the base and ultimately collects in the void between the vessel and the flat bottom of the outer vessel, therefore not condensing upon the food article contained therein.

Figure 3:
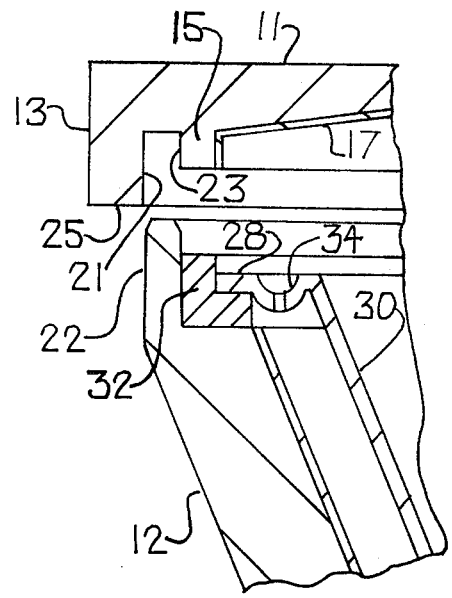
FIG. 3 is an exploded fragmentary sectional view of the container, showing in greater detail the relationship between the dual-flanged lid and the circumferentially raised chamfered rim of the outer vessel in disengaged fashion. Also shown is the nested annular ring and the circumferential flange of the vessel resting thereon.

Referring to FIG. 3, the distance between the inner surfaces 21 and 23 of the dual lid flanges 13 and 15 respectively, is slightly less than the thickness of the chamfered raised rim 22 of the outer vessel 12. When the outer vessel and lid members are circumferentially aligned, a downward pressure exerted upon the lid 11 will cause flanges 13 and 15 to flex slightly apart and permit the insertion of the rim 22 into the gap between said flanges, resulting in a relatively tight fit between the lid and outer vessel. When the container is so engaged, outer flange 13 overhangs the base 12 and the underportion 25 of said flange 13 can be used to gain access to the interior of said container by exerting an upward force on said underportion 25 via a manual lift-up motion, releasing the lid from the base.

Figure 4:
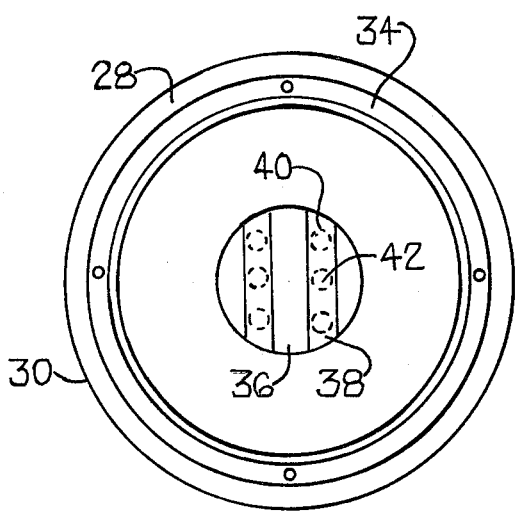
FIG. 4 is a plan view of the vessel showing its rigidized construction, plurality of broken line segments forming one or more closed curve outlines, perforated circum-ferential gutter, and peripheral flange.

Referring to FIG. 4, the flat bottom 36 of vessel 30 has a pattern formed by alternating recessed continuous flat planes 38 spanning the outer periphery, thus affording structural rigidity to the vessel. A preferred embodiment on the flat bottom is a plurality of notched broken line segments forming one or more closed curve outlines 40 which can be utilized to form one or more apertures by applying pressure to the area enclosed by such broken line segments 42. A novel feature of this preferred embodiment is such that if the vessel were to be configured to function as a deep fryer, apertures would be desirable as this would permit the run-off of oils from the interior of the vessel after the cooking process and also permit the run-off of excess cooking oils after the vessel has been returned to the container, the oils collecting at the bottom of the base cavity. This novel feature allows the prepared food article to remain free of soaking in its own cooking oils and thus prevents said food article from becoming soggy and otherwise losing its taste-appealing qualities.

In contrast, if the vessel were to be used for broiling or baking a food article wherein it would be beneficial for the food article to simmer in its own juices, apertures obviously would not be desired.

While I have illustrated and described the preferred embodiments of my invention by way of selected examples, it is to be understood that same are by no means restrictive thereof, and that it will be readily apparent to those ordinarily skilled in the art that various adaptations and modifications may be conceived and fabricated within the spirit and scope of the specification, drawings, and appended claims as equivalents of the invention.

What is claimed is:

1. A multi-component insulated food container comprising an outer vessel formed at least in part of heat-insulating material and having sides which terminate in an upstanding annular flange and an inwardly disposed peripheral ledge; an inner vessel for holding the food having a peripheral radially outwardly extending flange adapted to rest on the ledge of said outer vessel, said inner vessel being inwardly spaced from the outer vessel and defining an insulative air space therebetween; and a lid to close the container having a pair of spaced annular flanges at the periphery thereof adapted to sealably engage therebetween the upstanding annular flange of the outer vessel, said lid having a conically shaped inner surface, the vertex of which is fracturable to provide relief of vapor pressure that may accumulate within the container.

2. An insulated food container according to claim 1, in which the outer vessel comprises inner and outer components formed of material having different heat insulating values, the resistance of the outer component being greater than the heat insulating value of the material of the inner component.

3. An insulated food container according to claim 1, further comprising an annular insulating ring formed of material having a higher heat distortion resistance than the outer vessel, and disposed on the ledge of said outer vessel to support the flange of the inner vessel.

4. An insulated food container according to claim 3, in which the annular ring has an L-shaped radial cross section the upstanding portion of which is adapted to center the inner vessel within the outer vessel with the inner vessel flange resting upon the horizontal portion of said ring.

5. A multiple component insulated food container comprising an outer vessel having inner and outer components formed of material having different heat insulating values, the heat insulating value of the material of the outer component being greater than that of the material of the inner component, said outer vessel terminating in a rim portion having an inwardly disposed peripheral ledge; an annular ring formed of higher heat distortion resistant material than the outer vessel disposed on said peripheral radially outwardly extending ledge; an inner vessel having a peripheral flange with at least one aperture therethrough adapted to rest on said annular ring, said inner vessel being inwardly spaced from the inner component of the outer vessel to define an air space therebetween; and a lid to close the container having means adapted to sealably engage the rim portion of the outer vessel, and having a conically shaped portion inner surface, the vertex of which is fracturable to provide relief of vapor pressure that may accumulate within the inner vessel and the air space.

6. An insulated food container comprising an outer vessel formed at least in part of heat insulating material, and having sides which terminate in a peripheral rim portion having an upstanding annular flange and an inwardly disposed peripheral ledge; an inner vessel for holding the food having a peripheral radially outwardly extending flange adapted to rest on the ledge of said outer vessel, said inner vessel being inwardly spaced from the outer vessel and defining an air space therebetween; and a lid to close the container having a pair of spaced annular flanges adapted to sealably engage therebetween the upstanding annular flange of the outer vessel, and having normally closed internal pressure relieving means, which is operable to provide relief of high vapor pressure that may accumulate within the container.

7. An insulated food container according to claim 6, in which the pressure relieving means on said lid comprises a conically shaped inner surface having a vertex which is fracturable under high internal pressure.

8. An insulated food container according to claim 7, in which the conically shaped inner surface of the lid has a tapered cross-section which is thinnest in the area of the vertex.

9. An insulated food container comprising an outer vessel formed at least in part of heat insulating material, and having sides which terminate in a peripheral rim portion with an inwardly disposed peripheral ledge; an annular ring formed of material having higher heat distortion resistant characteristics than the outer vessel disposed on the peripheral ledge of the outer vessel; an inner vessel for holding the food having a peripheral radially outwardly extending flange adapted to rest on said annular ring, said inner vessel being inwardly spaced from the outer vessel and defining an air space therebetween; and a lid to close the container having means adapted to sealably engage the rim portion of the outer vessel, and having normally closed internal pressure relieving means, which is operable to provide relief of high vapor pressure that may accumulate within the sealed container.

* * * * *